US012746753B2

(12) United States Patent
Tomioka et al.

(10) Patent No.: US 12,746,753 B2
(45) Date of Patent: Sep. 29, 2026

(54) INKJET RECORDING APPARATUS

(71) Applicant: KYOCERA Document Solutions Inc., Osaka (JP)

(72) Inventors: Hiroyuki Tomioka, Osaka (JP); Kikunosuke Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 203 days.

(21) Appl. No.: 18/713,374

(22) PCT Filed: Nov. 22, 2022

(86) PCT No.: PCT/JP2022/043153
§ 371 (c)(1),
(2) Date: May 24, 2024

(87) PCT Pub. No.: WO2023/095782
PCT Pub. Date: Jun. 1, 2023

(65) Prior Publication Data

US 2025/0018713 A1 Jan. 16, 2025

(30) Foreign Application Priority Data

Nov. 26, 2021 (JP) ................................ 2021-192140

(51) Int. Cl.
*B41J 2/14* (2006.01)
*B41J 2/155* (2006.01)
*B41J 2/15* (2006.01)

(52) U.S. Cl.
CPC ............ *B41J 2/1433* (2013.01); *B41J 2/155* (2013.01); *B41J 2002/14411* (2013.01); *B41J 2/15* (2013.01)

(58) Field of Classification Search
CPC ... B41J 2/1433; B41J 2/155; B41J 2/15; B41J 2002/14411; B41J 19/00; B41J 25/34
See application file for complete search history.

(56) References Cited

U.S. PATENT DOCUMENTS 5,923,350 A 7/1999 Ohnishi et al.
7,578,588 B2 8/2009 Greiser
(Continued)

FOREIGN PATENT DOCUMENTS

CN 1669800 A 9/2005
JP H07-117308 A 5/1995
(Continued)

OTHER PUBLICATIONS

Office Action issued in CN 202280076911.5; mailed by the China National Intellectual Property Administration on Mar. 29, 2026.

*Primary Examiner* — Sharon Polk
(74) *Attorney, Agent, or Firm* — Studebaker Brackett PLLC

(57) ABSTRACT

A printer (1) includes: a head frame (30); a first positioning part (51) facing to a first area (31) of the head frame (30); a second positioning part (52) facing to a second area (32) of the head frame (30); a first protruding part (41) protruding from the first area (31) toward the first positioning part (51); a second protruding part (42) protruding from the second area (32) toward the second positioning part (52); a first groove part (51V) provided in the first positioning part (51) along the ejection direction; a first pressing part (61) pressing the first protruding part (41) to the first groove part (51V); a second pressing part (62) pressing the second protruding part (42) to the second positioning part (52); and a first regulation part (71L) and a second regulation part (72L) restricting a movement of the head frame (30) in the ejection direction.

10 Claims, 11 Drawing Sheets

(56) References Cited

U.S. PATENT DOCUMENTS

| | | | | |
|---|---|---|---|---|
| 10,987,929 | B2 | 4/2021 | Sue | |
| 11,760,092 | B2 * | 9/2023 | Sakaida | B41J 2/14209<br>347/85 |
| 2005/0206714 | A1 | 9/2005 | Greiser | |
| 2020/0247122 | A1 | 8/2020 | Sue | |
| 2020/0247155 | A1 * | 8/2020 | Sue | B41J 2/16517 |

FOREIGN PATENT DOCUMENTS

| | | | | |
|---|---|---|---|---|
| JP | 2014-213472 | A | 11/2014 | |
| JP | 2020-121514 | A | 8/2020 | |
| JP | 6860078 | B2 * | 4/2021 | B41J 2/16 |

* cited by examiner

INKJET RECORDING APPARATUS

TECHNICAL FIELD

The present invention relates to an inkjet recording apparatus which ejects ink to a sheet.

BACKGROUND

An inkjet recording apparatus in which multiple head units ejecting ink of different colors are arranged in a sheet conveyance direction is known. The head unit includes a plurality of inkjet heads arranged in a staggered manner. Because a color image is formed by superimposing the inks, to obtain correct color development, it is necessary to align the ejecting positions of the head units relative to the sheet. For this purpose, it is necessary to align the positions of the head units in the sheet width direction intersecting the conveyance direction and to arrange the head units equally spaced and parallel.

Therefore, a technique for accurately positioning the head units has been studied. For example, Patent Document 1 describes positioning the head units in the width direction by pressing the head units in the width direction against protrusions provided in a frame.

PRIOR ART DOCUMENTS

Patent Document

Patent Document 1: Japanese Patent Laid-Open No. 2020-121514

SUMMARY OF THE INVENTION

Problems to be Solved by Invention

When adopting the configuration for pressing the head units in the width direction described in Patent Document 1, it is necessary to suppress the deformation of the head frame for supporting the inkjet heads. For example, the deformation of the head frame can be prevented by using the box-shaped head frame and using a high-rigidity component, such as an aluminum die cast, for a position to which a biasing load is applied. However, since the box-shaped head frame is structured to enclose the inkjet heads, the size of the head unit becomes large.

To reduce the size of the head unit, a configuration in which the inkjet heads are arranged on both side surfaces of a flat head frame whose thickness direction is perpendicular to the longitudinal direction of the inkjet head. However, in this case, the head frame is less rigid than the box-shaped head frame, and there is a risk that the head frame may be deformed in an arch shape by the biasing.

To provide an inkjet recording apparatus capable of suppressing bending deformation of a flat head frame whose thickness direction is perpendicular to an ejection direction of an inkjet head in consideration of the above circumstances.

Means of Solving the Problems

To solve the above problem, an inkjet recording apparatus according to the present invention includes: an inkjet head which ejects ink; a flat plate-shaped head frame whose thickness direction is along a first direction perpendicular to an ejection direction of the inkjet head and holding the inkjet head; a first positioning part facing in the thickness direction to a first area of the head frame on one end side in a second direction perpendicular to the ejection direction and the first direction; a second positioning part facing in the thickness direction to a second area of the head frame on the other end side in the second direction; a first protruding part protruding from the first area toward a side of the first positioning part; a second protruding part protruding from the second area toward a side of the second positioning part; a first groove part provided in the first positioning part along the ejection direction; a first pressing part pressing the first protruding part to the first groove part; a second pressing part pressing the second protruding part to the second positioning part; and a regulation part restricting a movement of the head frame in the ejection direction.

Effects of the Invention

According to the present invention, it becomes possible to suppress bending deformation of a flat plate-shaped frame whose thickness direction is along a direction perpendicular to the ejection direction of an inkjet head.

EMBODIMENT FOR CARRYING OUT THE INVENTION

Hereinafter, with reference to the drawings, a printer 1 (an example of an inkjet recording apparatus) according to one embodiment of the present invention will be described.

Figure 1:
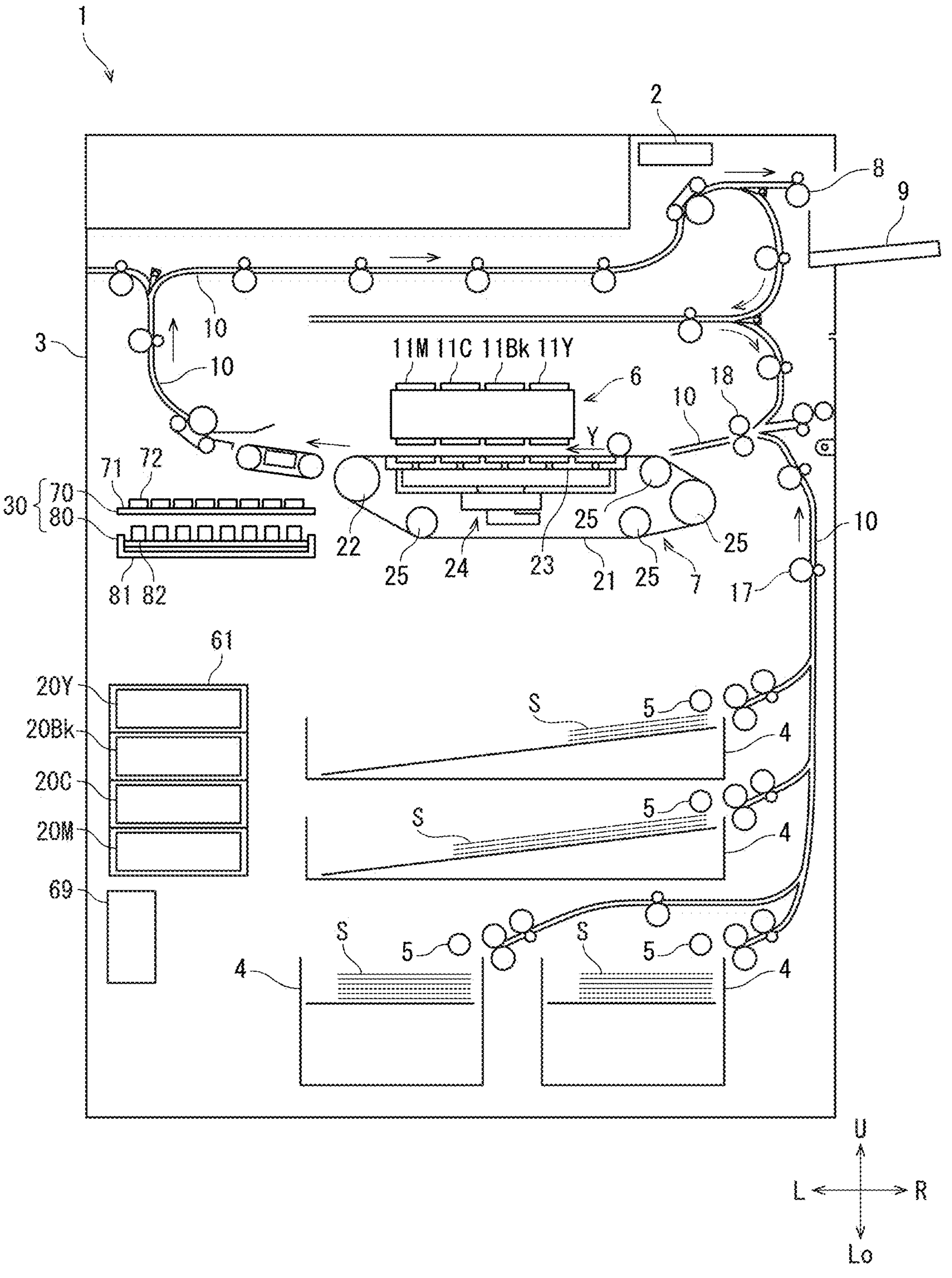
FIG. 1 is a front view schematically showing an internal structure of a printer according to one embodiment of the present invention.
Figure 2:
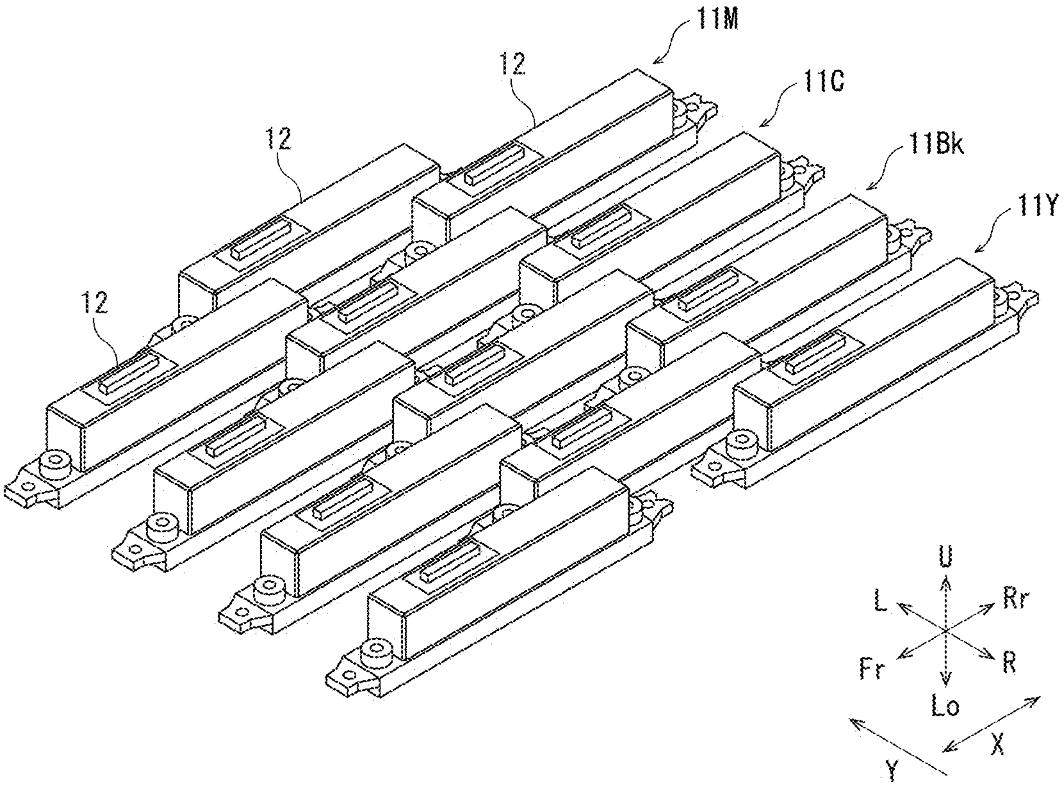
FIG. 2 is a perspective view explaining an arrangement of inkjet heads according to the embodiment of the present invention.
Figure 3:
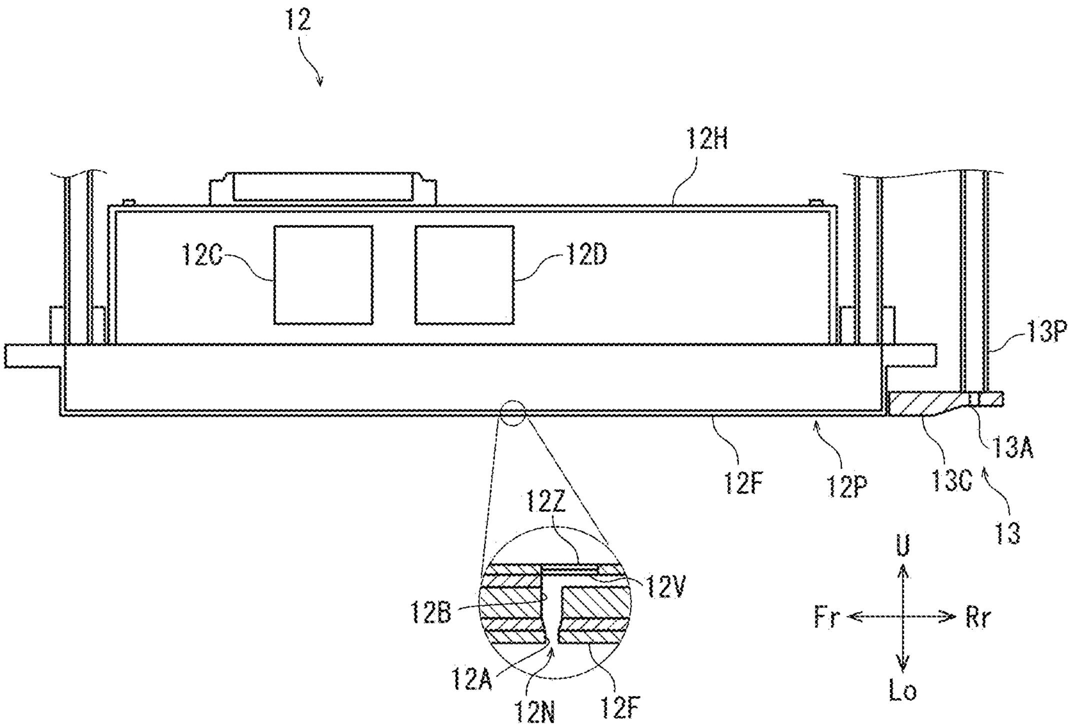
FIG. 3 is a cross-sectional view showing the inkjet head according to the embodiment of the present invention.

First, an entire structure of the printer 1 will be described. FIG. 1 is a front view schematically showing the internal structure of the printer 1. FIG. 2 is a perspective view explaining an arrangement of inkjet heads 12. FIG. 3 is a cross-sectional view of the inkjet head 12. Hereafter, the front side of the paper plane on which FIG. 1 is drawn is defined as the front side of the printer 1, and the left-and-right direction is described with reference to the direction in which the printer 1 is viewed from the front. In each figure, U, Lo, L, R, Fr and Rr indicate the upper, lower, left, right, front and rear, respectively.

The printer 1 (see FIG. 1) includes a box-shaped body housing 3. In the lower portion in the body housing 3, a sheet feeding cassette 4 in which a sheet S such as a plain paper and a coated paper is stored and a sheet feeding roller 5 which feeds the sheet S rightward from the sheet feeding cassette 4 are provided. Above the sheet feeding cassette 4, a conveyance unit 7 is provided to attract the sheet S and convey it in the Y direction. Above the conveyance unit 7, an image forming unit 6 is provided to form an image by ejecting ink downward. In the upper right portion in the body housing 3, a sheet discharge roller 8 which discharges the sheet S on which the image is formed and a sheet discharge tray 9 on which the discharged sheet S is stacked are provided.

Inside the body housing 3, a conveyance path 10 is provided from the sheet feeding roller 5 through a gap between the conveyance unit 7 and the image forming unit 6 to the sheet discharge roller 8. The conveyance path 10 is formed mainly of plate-like members facing each other with a gap for passing the sheet S, and conveyance rollers 17 for holding and conveying the sheet S are provided at multiple locations in the conveyance direction Y. A registration roller 18 is provided upstream of the image forming unit 6 in the conveyance direction Y.

The conveyance unit 7 includes an endless conveyance belt 21, a support plate 23, and a suction part 24. The conveyance belt 21 has a number of vent holes (not shown), and is wound around a drive roller 25 and a driven roller 22. The support plate 23 has a number of vent holes, and the upper surface is in contact with the inner surface of the conveyance belt 21. The suction part 24 attracts the sheet S to the conveyance belt 21 by sucking air through the vent holes of the support plate 23 and the vent holes of the conveyance belt 21. When the drive roller 25 is driven in the counterclockwise direction by a drive unit (not shown) including a motor and a reduction gear, the conveyance belt 21 travels in the counterclockwise direction, and the sheet S attracted by the conveyance belt 21 is conveyed in the Y direction.

The image forming unit 6 includes head units 11Y, 11Bk, 11C and 11M (collectively referred to as a head unit 11) and ejects yellow, black, cyan and magenta inks, respectively. Ink containers 20Y, 20Bk, 20C and 20M (collectively referred to as an ink container 20) filled with the yellow, black, cyan and magenta inks are connected to the head units 11Y, 11Bk, 11C and 11M, respectively.

The head unit 11 contains one or more inkjet heads 12, for example, three inkjet heads 12 arranged in a staggered manner (see FIG. 2). The inkjet head 12 (see FIG. 3) includes a rectangular box-shaped housing 12H whose longitudinal direction is along the front-and-rear direction and a nozzle plate 12P provided at the bottom of the housing 12H. The nozzle plate 12P has a number of nozzles 12N lined up in the front-and-rear direction. The nozzle 12N includes a branch flow path 12B branched from a flow path leading to the ink container 20 and a discharge port 12A provided on a nozzle surface 12F. A diaphragm 12V forms a part of the inner wall of the branch flow path 12B. Each of the diaphragms 12V is provided with a piezo element 12. The housing 12H is provided with a piezo driver 12D for driving the piezo element 12Z and a control circuit 12C for controlling the piezo driver 12D.

A control part 2 (see FIG. 1) includes an arithmetic part and a storage part. The arithmetic part is, for example, a CPU (Central Processing Unit). The storage part includes storage media such as ROM (Read Only Memory), RAM (Random Access Memory) and EEPROM (Electrically Erasable Programmable Read Only Memory). The arithmetic part performs various processes by reading and executing the control program stored in the storage part. The control part 2 may be realized by an integrated circuit without using software.

An operation part is provided on the upper portion of the body housing 3 (not shown). The operation part includes a display panel, a touch panel provided on the display surface of the display panel and a keypad adjacent to the display panel. The control part 2 displays a screen representing an operation menu, status or the like of the printer 1 on the display panel, and controls each part of the printer 1 according to the operation detected by the touch panel and keypad.

The basic image forming operation of the printer 1 is as follows. When an image forming job is input to the printer 1 from the operation part or an external computer, the sheet feeding roller 5 feeds the sheet S from the sheet feeding cassette 4 to the conveyance path 10, and the registration roller 18, whose rotation has been stopped, corrects the skew of the sheet S. When the registration roller 18 feeds the sheet S to the conveyance unit 7 at a predetermined timing, the conveyance unit 7 attracts the sheet S to the conveyance belt 21 and conveys it in the Y direction. When the control part 2 supplies the raster-type image data to the control circuit 12C in synchronization with the conveyance of the sheet S, the piezo driver 12D supplies an ejection signal corresponding to the image data to the piezo element 12Z, and the ink is ejected downward (an example of the ejection direction) from the nozzle 12N to form an image on the sheet S. The sheet discharge roller 8 discharges the sheet S on which the image is formed to the sheet discharge tray 9.

Figure 4:
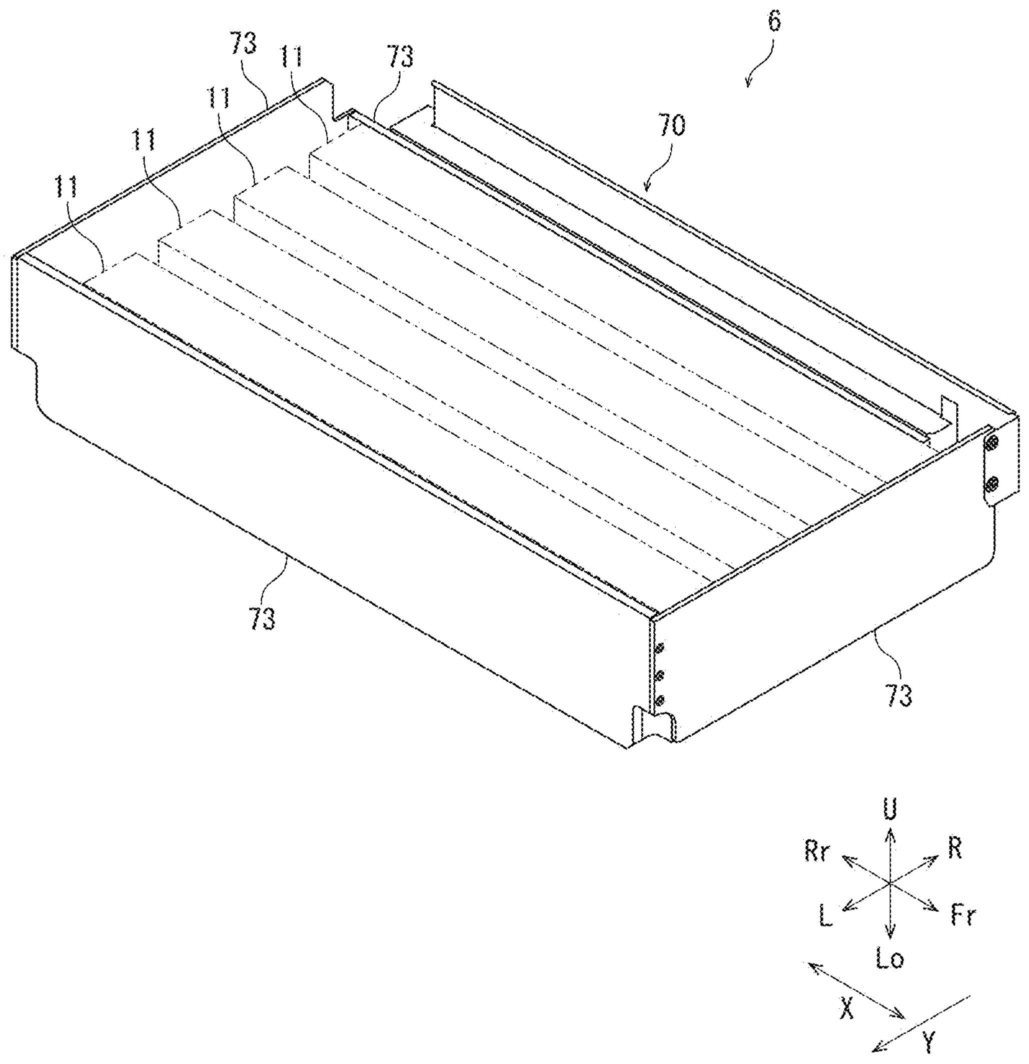
FIG. 4 is a perspective view showing an image forming unit according to the embodiment of the present invention.
Figure 5:
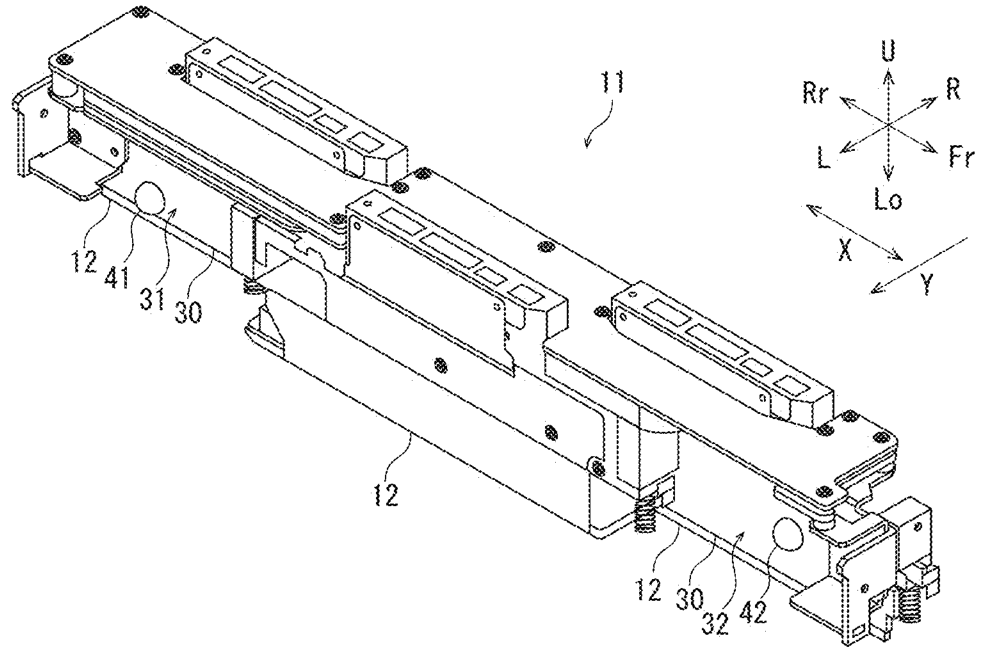
FIG. 5 is a perspective view showing the head unit according to the embodiment of the present invention.
Figure 6:
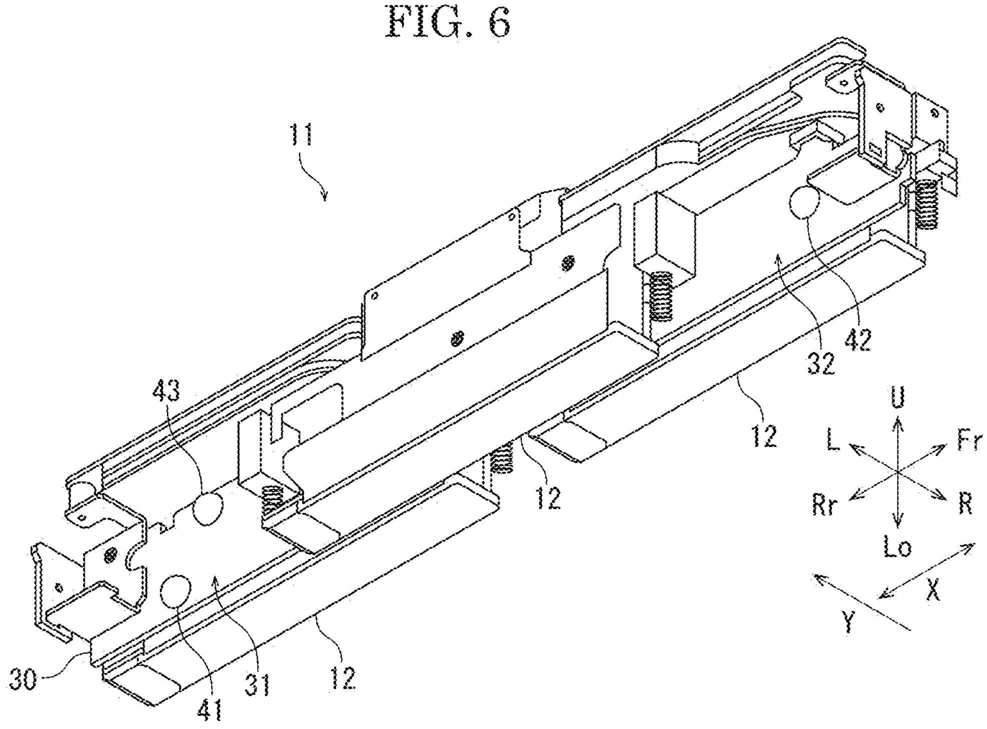
FIG. 6 is a perspective view showing the head unit according to the embodiment of the present invention.
Figure 7:
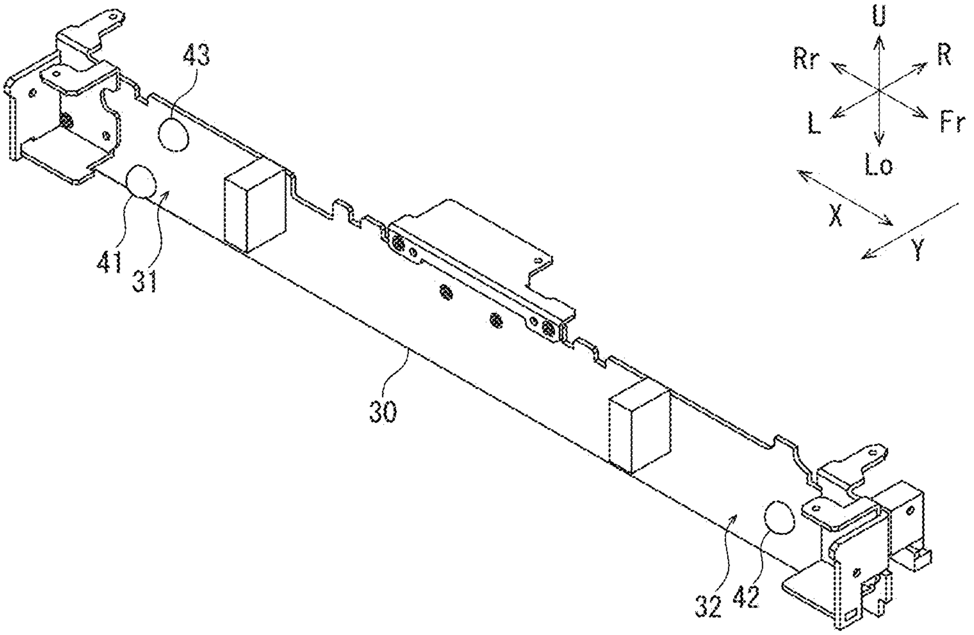
FIG. 7 is a perspective view showing a head frame according to the embodiment of the present invention.
Figure 8:
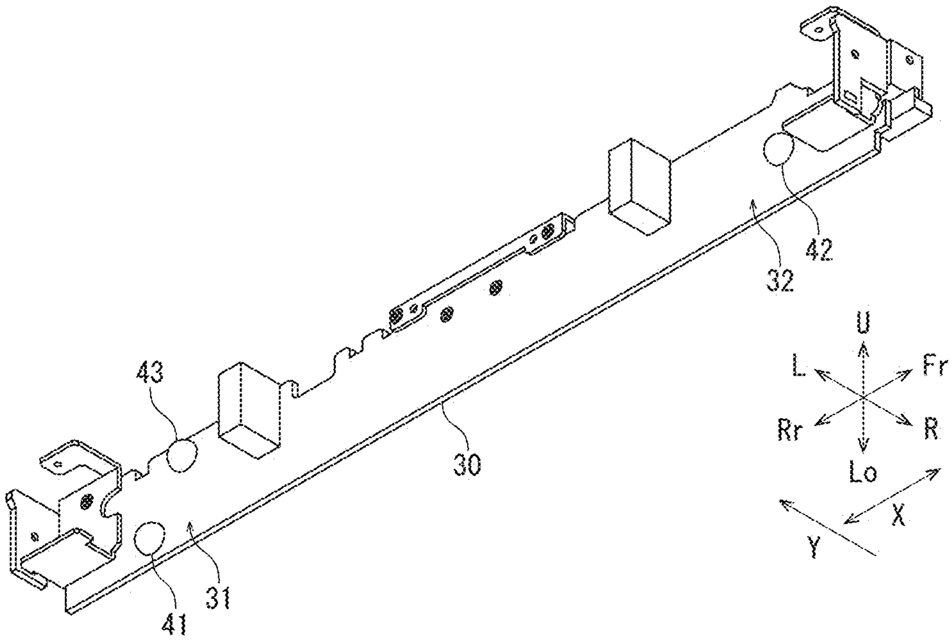
FIG. 8 is a perspective view showing the head frame according to the embodiment of the present invention.
Figure 9:
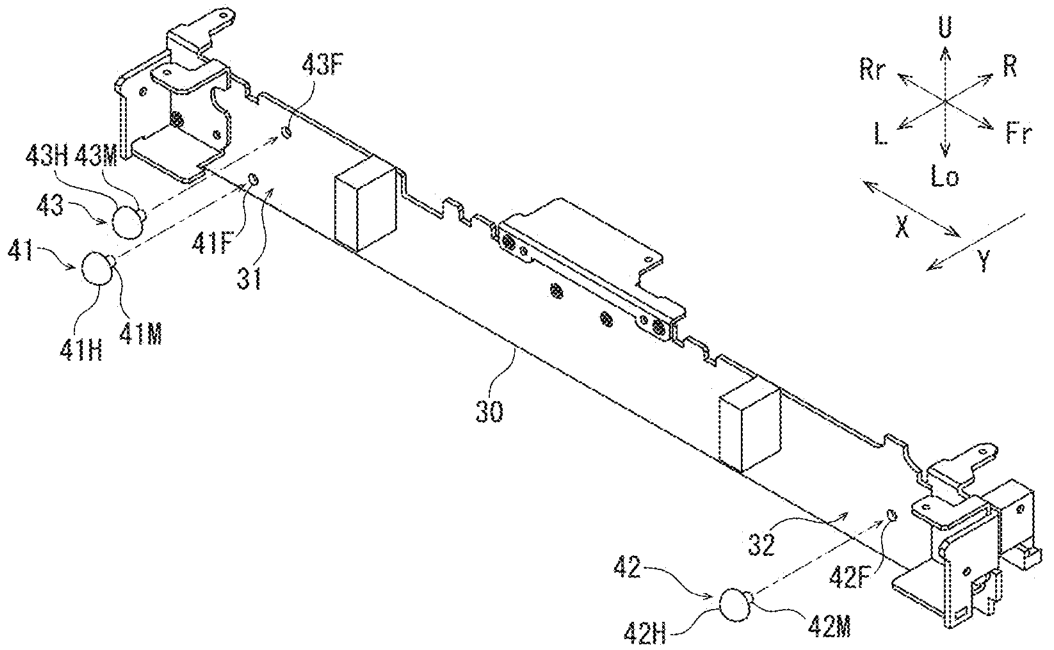
FIG. 9 is a disassembled view showing the head frame according to the embodiment of the present invention.
Figure 10:
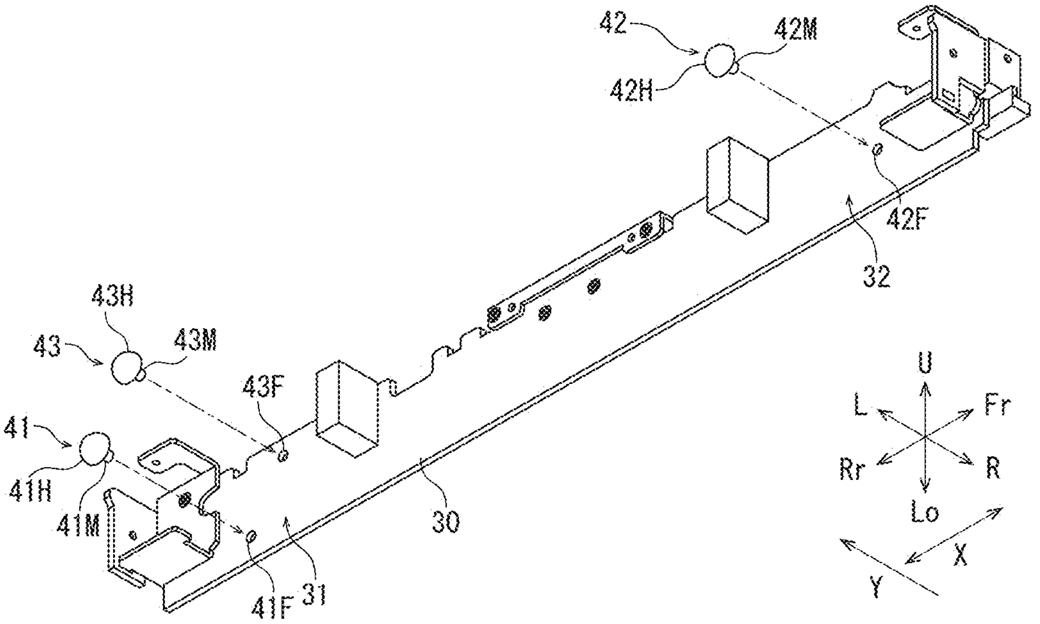
FIG. 10 is a disassembled view showing the head frame according to the embodiment of the present invention.
Figure 11:
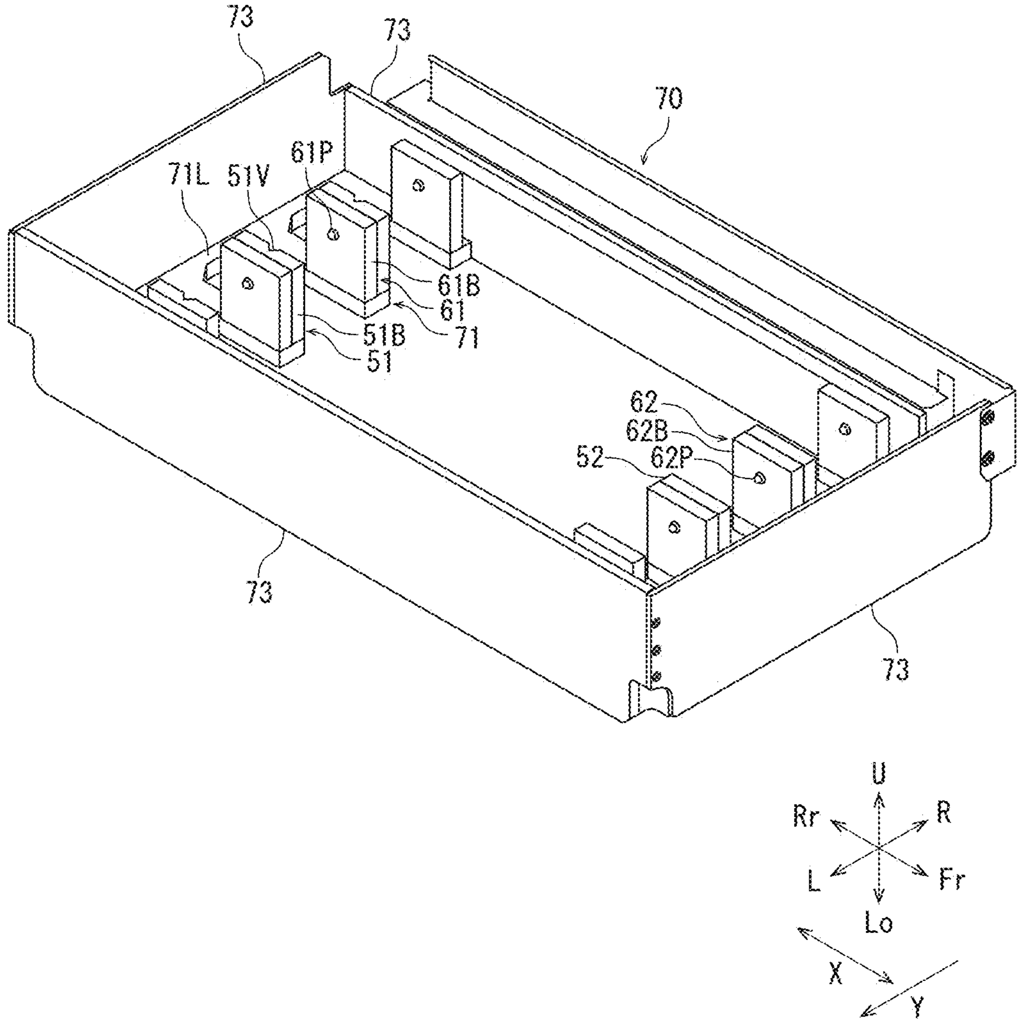
FIG. 11 is a perspective view showing an image forming frame according to the embodiment of the present invention.
Figure 12:
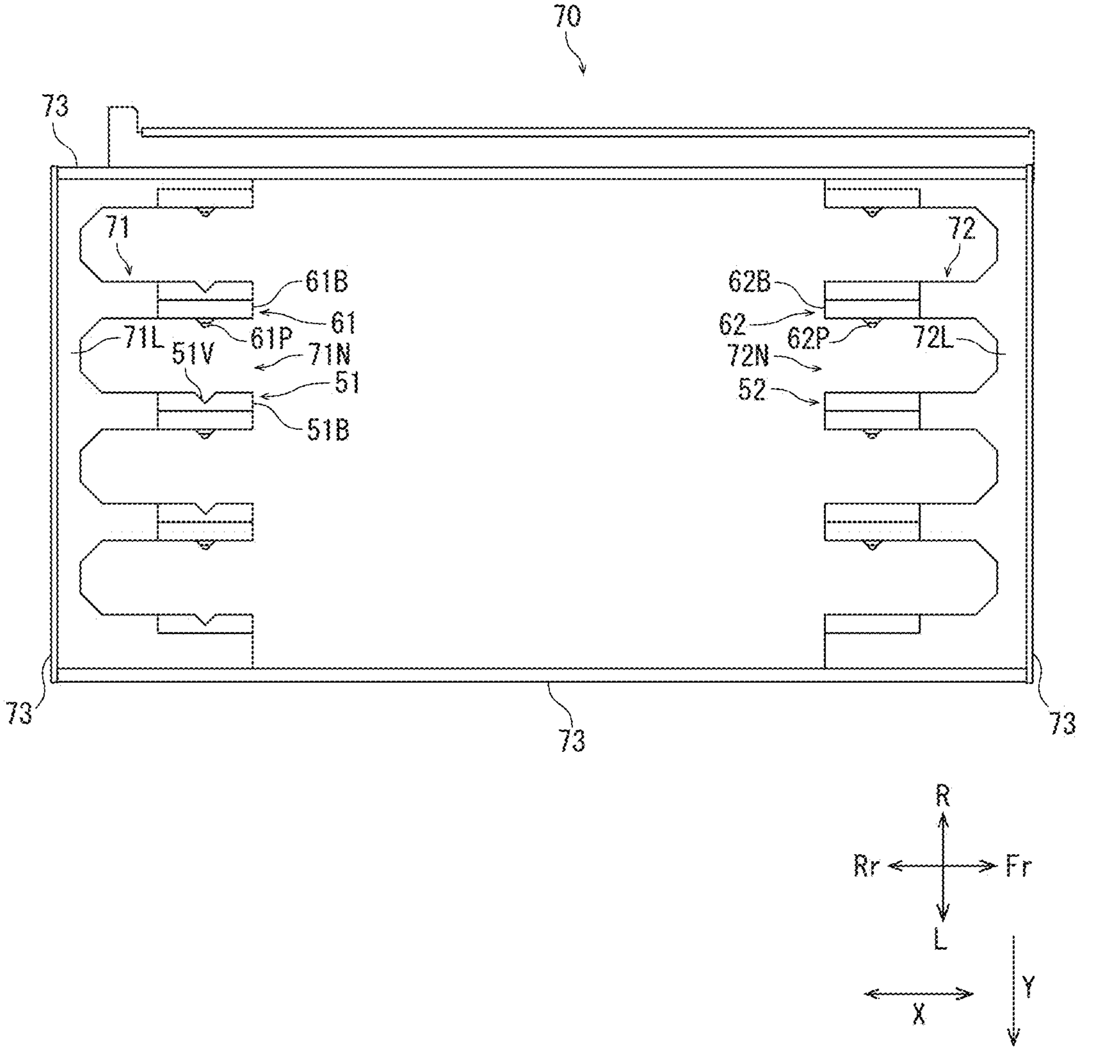
FIG. 12 is a plan view showing the image forming frame according to the embodiment of the present invention.
Figure 13:
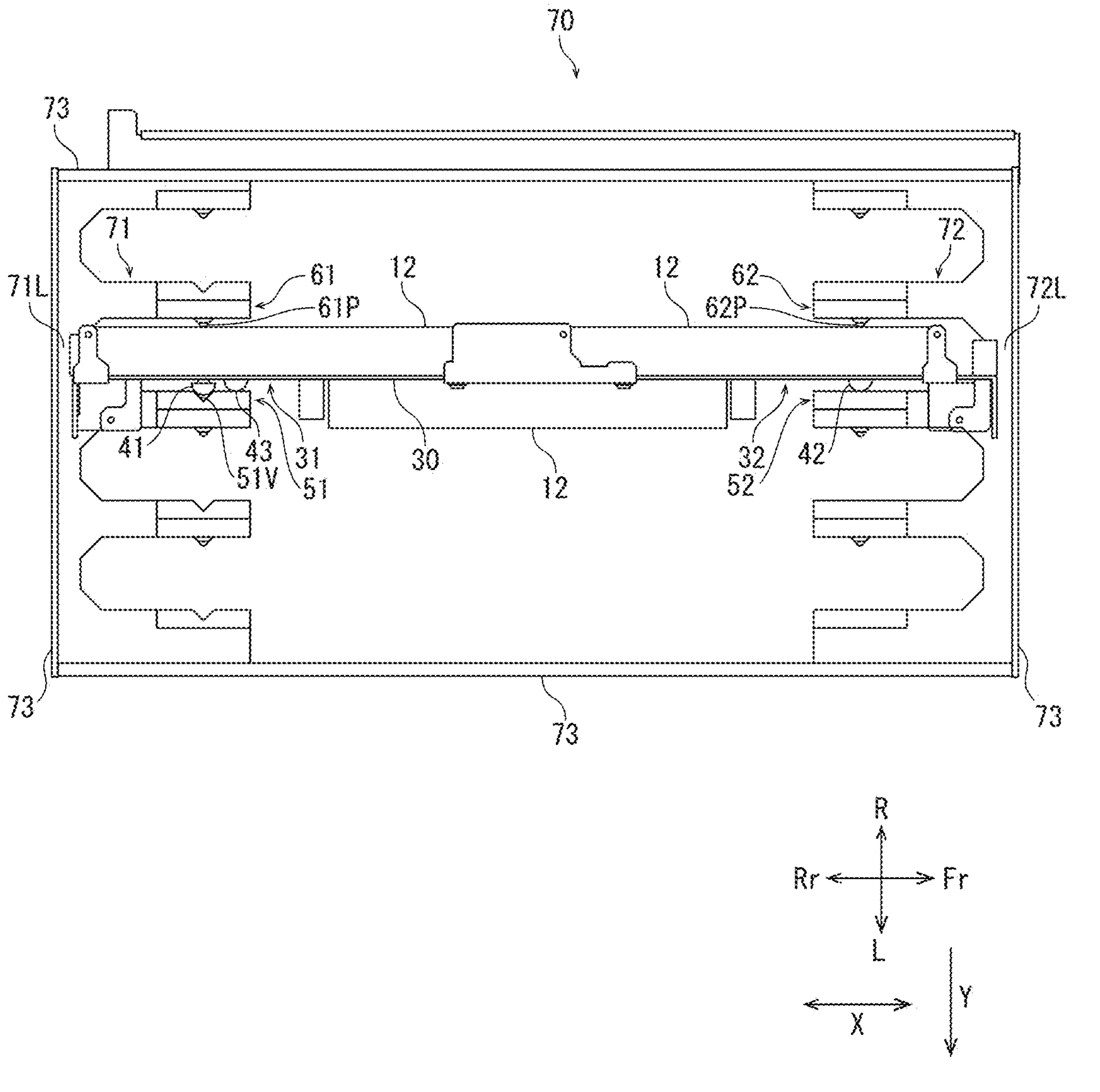
FIG. 13 is a plan view showing one head unit attached to the image forming frame according to the present invention.

Next, a configuration for positioning the head units 11 will be described. FIG. 4 is a perspective view showing the image forming unit 6. FIG. 5 and FIG. 6 are perspective views showing the head unit 11. FIG. 7 and FIG. 8 are perspective views showing a head frame 30. FIG. 9 and FIG. 10 are disassembled views showing the head frame 30. FIG. 11 is a perspective view showing an image forming frame 70. FIG. 12 is a plan view showing the image forming frame 70. FIG. 13 is a plan view showing one head unit 11 attached to the image forming frame 70.

The printer 1 includes the inkjet head 12, a flat plate-shaped head frame 30, a first positioning part 51, a second positioning part 52, a first protruding part 41, a second protruding part 42, a first groove part 51V, a first pressing part 61, a second pressing part 62, a first regulation part 71L and a second regulation part 72L (an example of a regulation part). The inkjet head 12 ejects the ink. The head frame 30 is provided such that the thickness direction is along a first direction perpendicular to the ejection direction of the inkjet head 12, and holds the inkjet head 12. The first positioning part 51 faces in the thickness direction to a first area 31 of the head frame 30 on one end side in a second direction perpendicular to the ejection direction and the first direction. The second positioning part 52 faces in the thickness direction to a second area 32 of the head frame 30 on the other end side in the second direction. The first protruding part 41 protrudes from the first area 31 toward a side of the first positioning part 51. The second protruding part 42 protrudes from the second area 32 toward a side of the second positioning part 52. The first groove part 51V is provided in the first positioning part 51 along the ejection direction. The first pressing part 61 presses the first protruding part 41 to the first groove part 51V. The second pressing part 62 presses the second protruding part 42 to the second positioning part 52. The first regulation part 71L and the second regulation part 72L restricts a movement of the head frame 30 in the ejection direction.

The printer 1 according to the embodiment is a so-called line-head inkjet printer. Also, in this embodiment, the first direction is the same as the conveyance direction Y of the sheet S conveyed along the conveyance path 10, and the second direction is the same as the sheet width direction X intersecting the conveyance direction Y. This is because the inkjet heads 12 are arranged such that the longitudinal direction of the inkjet head 12 is perpendicular to the conveyance direction Y of the sheet S.

In addition, the inkjet heads 12 may be arranged such that the longitudinal direction of the inkjet head 12 is oblique to the conveyance direction Y of the sheet S. In this case, the longitudinal direction of the inkjet head 12 is the second direction, and a direction perpendicular to the second direction is the first direction.

In another embodiment, there is a so-called serial head inkjet printer which alternately performs a scanning in which carriage mounted with the head frame 30 is reciprocated with respect to the sheet S and a conveying in which the sheet S is moved in a direction intersecting the scanning direction. In the serial method, the inkjet heads 12 may be arranged such that the longitudinal direction of the inkjet head 12 is perpendicular to the scanning direction. In this case, the first direction is the same as the width direction X of the sheet S perpendicular to the conveyance direction Y of the conveyed sheet S, and the second direction is the same as the conveyance direction Y of the conveyed sheet S.

In addition, the inkjet heads 12 may be arranged such that the longitudinal direction of the inkjet head 12 is oblique to the scanning direction. In this case, the longitudinal direction of the inkjet head 12 is the second direction, and a direction perpendicular to the second direction is the first direction.

Since the configuration of the inkjet head 12 has been described above, other components will be described below.

[Head Frame] The head frame 30 (see FIG. 7 and FIG. 8) is a plate-like member forming the framework of the head unit 11, and as a whole, forms a rectangle whose longitudinal direction is along the front-and-rear direction, and is arranged such that the thickness direction of the head frame 30 is along the conveyance direction Y of the sheet S. On the left and right side surfaces of the head frame 30, an odd number (in this example, three) of the inkjet heads 12 are arranged in a staggered manner (see FIG. 5 and FIG. 6). In this example, the inkjet heads 12 are provided on the front and rear portions of the right side surface of the head frame 30 and on the center portion of the left side surface in the front-and-rear direction. Therefore, an area where the inkjet head 12 is not provided exists on the front and rear portions of the left side surface of the head frame 30 (one example of the side with less inkjet head 12). Of these, the rear area (one example of the area on one end side) is called a first area 31, and the front area (one example of the area on the other end side) is called a second area 32.

[Image Forming Frame] The image forming unit 6 includes an image forming frame 70 surrounding the front, rear, left and right sides of the four head units 11 aligned in the conveyance direction Y (see FIG. 4, FIG. 11, FIG. 12 and FIG. 13). The image forming frame 70 is a frame body mainly composed of four side wall parts 73 facing in the front-and-rear direction and in the left-and-right direction, a first bottom plate part 71 and a second bottom plate part 72.

The first bottom plate part 71 is provided at the rear bottom portion of the image forming frame 70. The first bottom plate part 71 is provided forward from the lower end portion of the rear side wall part 73 for a predetermined length, and is provided with a first notch 71N opened forward at four positions in the left-and-right direction. The first notches 71N prevent interference between the first bottom plate part 71 and the inkjet heads 12.

The second bottom plate part 72 is provided at the front bottom portion of the image forming frame 70. The second bottom plate part 72 is provided rearward from the lower end portion of the front side wall part 73 for a predetermined length, and is provided with a second notch 72N opened rearward at four positions in the left-and-right direction. The second notches 72N prevent interference between the second bottom plate part 72 and the inkjet heads 12.

[First Positioning Part, First Groove Part, First Pressing Part, First Regulation Part] On the upper surface of the first bottom plate part 71, four sets of first positioning part 51 and first pressing part 61 which face each other across the first notch 71N are provided. The first positioning part 51 is provided on the left side of the first notch 71N, and the first pressing part 61 is provided on the right side of the first notch 71N.

The first positioning part 51 includes a plate-shaped body part 51B facing the first area 31 of the head frame 30 and a first groove part 51V provided on the right side surface of the body part 51B. The right side surface of the body part 51B is planar. The first groove part 51V is a groove provided along the ink ejection direction. The first groove part 51V is tapered in the depth direction, and the shape of the cross section of the first groove part 51V as viewed from the ejection direction is V-shaped.

The first pressing part 61 includes a plate-shaped body part 61B facing the rear inkjet head 12 on the right side surface of the head frame 30 and a ball plunger 61P fixed on the left side surface of the body part 61B and generating pressing force to the left side.

The first regulation part 71L (an example of the regulation part) is a portion of the first bottom plate part 71 on the rear side of the first notch 71N. The first regulation part 71L is in contact with the lower end portion of the rear end portion of the head frame 30 to support the head frame 30.

[Second Positioning Part, Second Pressing Part, Second Regulation Part] On the upper surface of the second bottom plate part 72, four sets of second positioning part 52 and second pressing part 62 which face each other across the second notch 72N are provided. The second positioning part 52 is provided on the left side of the second notch 72N, and the second pressing part 62 is provided on the right side of the second notch 72N.

The second positioning part 52 is a plate-shaped member facing the second area 32 of the head frame 30. The right side surface of the second positioning part 52 is planer. The second pressing part 62 includes a plate-shaped body part 62B facing the front inkjet head 12 on the right side surface of the head frame 30 and a ball plunger 62P fixed on the left side surface of the body part 62B and generating pressing force to the left side.

The second regulation part 72L (an example of the regulation part) is a portion of the second bottom plate part 72 on the front side of the second notch 72N. The second regulation part 72L is in contact with the lower end portion of the front end portion of the head frame 30 to support the head frame 30.

[First Protruding Part] A first protruding part 41 (see FIG. 5 to FIG. 10) is provided at the first area 31 and protrudes leftward (one example of the side of the first positioning part 51). The first protruding part 41 is provided closer to the conveyance path 10 than the center of the head frame 30 in the ink ejection direction. The first protruding part 41 has a hemispherical head portion 41H and a male screw portion 41M protruding from the head portion 41H rightward (to the side of the head frame 30). The head frame 30 has a female screw portion 41F into which the male screw portion 41M is screwed. An amount of protrusion of the first protruding part 41 from the first area 31 is adjusted by tightening and loosening the male screw portion 41M. When the first pressing part 61 presses the head frame 30 leftward through the inkjet head 12, the first protruding part 41 is pressed against the first groove part 51V.

[Second Protruding Part] A second protruding part 42 is provided at the second area 32 and protrudes leftward (one example of the side of the second positioning part 52). The second protruding part 42 is provided at the center of the head frame 30 in the ink ejection direction. The second protruding part 42 has a hemispherical head portion 42H and a male screw portion 42M protruding from the head portion 41H rightward (to the side of the head frame 30). The head frame 30 has a female screw portion 42F into which the male screw portion 42M is screwed. An amount of protrusion of the second protruding part 42 from the first area 31 is adjusted by tightening and loosening the male screw portion 42M. When the second pressing part 62 presses the head frame 30 leftward through the inkjet head 12, the second protruding part 42 is pressed against the second groove part 52V.

[Third Protruding Part] A third protruding part 43 is provided at the first area 31 and protrudes leftward (one example of the side of the first positioning part 51). The third protruding part 43 is provided at a position farther from the conveyance path 10 than the first protruding part 41 (an example of the position different from the first protruding part 41 in the ejection direction). In addition, the third protruding part 43 faces the outside planer portion of the first groove part 51V of the first positioning part 51. The third protruding part 43 has a hemispherical head portion 43H and a male screw portion 43M protruding from the head portion 43H rightward (to the side of the head frame 30). The head frame 30 has a female screw portion 43F into which the male screw portion 43M is screwed. An amount of protrusion of the third protruding part 43 from the first area 31 is adjusted by tightening and loosening the male screw portion 43M. When the first pressing part 61 presses the head frame 30 leftward through the inkjet head 12, the third protruding part 43 is pressed against the outside planer portion of the first groove part 51V.

The head unit 11 is attached to the image forming frame 70 from above (see FIG. 13). Specifically, above the image forming frame 70, the first protruding part 41 is positioned just above the first groove part 51V, and the head frame 30 is inserted between the first positioning part 51 and the first pressing part 61, and between the second positioning part 52 and the second pressing part 62, and then the head frame 30 is lowered. At this time, the first protruding part 41 is guided along the first groove part 51V. When the lower end portion of the rear end portion of the head frame 30 comes into contact with the first regulation part 71L and the lower end portion of the front end portion comes into contact with the second regulation part 72L, the lowering of the head frame 30 stops and the head frame 30 is positioned in the ejection direction. The first pressing part 61 presses the first protruding part 41 against the first groove part 51V to position the head frame 30 in the width direction X and positioning the first area 31 in the conveyance direction Y. The second pressing part 62 presses the second protruding part 42 against the second positioning part 52 to position the second area 32 in the conveyance direction Y.

Here, for example, if the first protruding part 41 and the first groove part 51V may be formed in a V-shape similar to each other, since the first pressing part 61 presses the first protruding part 41 against the first groove part 51V and the first groove part 51V constrains the posture of the first protruding part 41, there is a risk that bending deformation may occur in the head frame 30 due to dimensional errors in the parts. On the other hand, in the present embodiment, since the first protruding part 41 is hemispherical and the first groove part 51V is V-shaped, the first protruding part 41 comes into contact with the first groove part 51V at two points containing one point on each of the two planer surfaces of the first groove part 51V. Therefore, even if there is the dimensional error in the parts, since the first groove part 51V does not constrain the posture of the first protruding part 41, bending deformation is hardly to occur in the head frame 30.

For example, if the second protruding part 42 may be cylindrical and the right side surface of the second positioning part 52 may be planar, since the second pressing part 62 presses the second protruding part 42 against the second positioning part 52 and the second positioning part 52 constrains the posture of the second protruding part 42, bending deformation may occur in the head frame 30 due to dimensional error of the parts. On the other hand, in the present embodiment, since the second protruding part 42 is hemispherical and the right side surface of the second positioning part 52 is planar, the second protruding part 42 comes into contact with the second positioning part 52 at one point. Therefore, even if there is the dimensional error in the parts, since the second positioning part 52 does not constrain the posture of the second protruding part 42, the bending deformation is hardly to occur in the head frame 30.

The printer 1 according to the present embodiment described above includes the inkjet head 12, the flat plate-shaped head frame 30, the first positioning part 51, the second positioning part 52, the first protruding part 41, the second protruding part 42, the first groove part 51V, the first pressing part 61, the second pressing part 62, the first regulation part 71L and the second regulation part 72L (an example of a regulation part). The inkjet head 12 ejects the ink. The head frame 30 is provided such that the thickness direction is along a first direction perpendicular to the ejection direction of the inkjet head 12, and holds the inkjet head 12. The first positioning part 51 faces in the thickness direction to a first area 31 of the head frame 30 on one end side in a second direction perpendicular to the ejection direction and the first direction. The second positioning part 52 faces in the thickness direction to a second area 32 of the head frame 30 on the other end side in the second direction. The first protruding part 41 protrudes from the first area 31 toward a side of the first positioning part 51. The second protruding part 42 protrudes from the second area 32 toward a side of the second positioning part 52. The first groove part 51V is provided in the first positioning part 51 along the ejection direction. The first pressing part 61 presses the first protruding part 41 to the first groove part 51V. The second pressing part 62 presses the second protruding part 42 to the second positioning part 52. The first regulation part 71L and the second regulation part 72L restricts a movement of the head frame 30 in the ejection direction. With this configuration, the positioning of the head frame in the width direction X is performed without pressing the head frame 30 in the width direction X, so the bending deformation of the flat plate-shaped head frame 30 whose thickness direction is perpendicular to the longitudinal direction of the inkjet head 12 can be suppressed.

In addition, according to the printer 1 according to the present embodiment, the first groove part 51V is tapered in the depth direction, and the first protruding part 41 is hemispherical. According to this configuration, since the first groove part 51V does not constrain the posture of the first protruding part 41, the bending deformation of the head frame 30 can be suppressed.

In addition, according to the printer 1 according to the present embodiment, the second positioning part 52 is planar, and the second protruding part 42 is hemispherical. According to this configuration, since the second positioning part 52 does not constrain the posture of the second protruding part 42, the bending deformation of the head frame 30 can be suppressed.

Also, according to the printer 1 according to the present embodiment, the first protruding part 41 and the second protruding part 42 are provided with the male screw portions 41M and 42M protruding toward the head frame 30, and the head frame 30 is provided with the female screw portions 41F and 42F into which the male screw portions 41M and 42M are screwed. With this configuration, the position of the head frame 30 in the first direction can be adjusted by adjusting the amount of protrusion of the first protruding part 41 and the second protruding part 42.

In addition, according to the printer 1 according to the present embodiment, the first protruding part 41 is provided on the downstream side of the center of the head frame 30 in the ejection direction. In a case where the first protruding part 41 is provided on the upstream side of the center of the head frame 30 in the ejection direction, it is necessary to visually adjust the position of the head frame 30 in the width direction X until the first protruding part 41 comes into contact with the first groove part 51V. However, according to this embodiment, it is not necessary to visually adjust the position of the head frame 30 in the width direction X because the head frame 30 is guided to the proper position in the width direction X by first aligning the first protruding part 41 with the first groove part 51V and then sliding the first protruding part 41 along the first groove part 51V. Therefore, according to this embodiment, the positioning of the head frame 30 in the width direction X is facilitated.

In addition, according to the printer 1 according to the present embodiment, the printer 1 includes the third protruding part 43 which protrudes from the first area 31 toward the first positioning part 51, is provided at a position different from the first protruding part 41 in the ejection direction, and faces the outside planar portion of the first groove part 51V of the first positioning part 51, and the first pressing part 61 presses the third protruding part 43 against the planar portion. With this configuration, the fall and vibration of the head frame 30 can be suppressed.

In addition, according to the printer 1 according to the present embodiment, an odd number of the inkjet heads 12 are arranged on both the side surfaces of the head frame 30 in the staggered manner, and the first protruding part 41 and the second protruding part 42 are provided on the side surface of the head frame 30 where the number of inkjet heads 12 is small. According to this configuration, since the first protruding part 41 and the second protruding part 42 are provided within the range of the head frame 30 in the width direction X, the size of the image forming unit 6 in the width direction X can be suppressed.

The above embodiment may be modified as follows.

Figure 14:
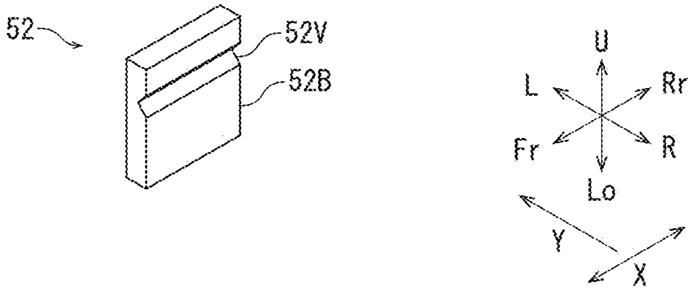
FIG. 14 is a perspective view showing a second positioning part according to a first modified example of the present invention.

[First Modified Example] In addition to the configuration of the above embodiment, a second groove part 52V may be provided in the second positioning part 52 along the width direction X, and the second pressing part 62 may be configured to press the second protruding part 42 against the second groove part 52V. FIG. 14 is a perspective view showing the second positioning part 52 according to the first modified example. The second positioning part 52 includes a plate-shaped body part 52B facing the second area 32 of the head frame 30 and the second groove part 52V provided on the right side surface the body part 52B. The second groove part 52V is a groove provided along the width direction X. The second groove part 52V is tapered in the depth direction, and the cross section of the second groove part 52V as viewed from the width direction X is V-shaped. With this configuration, the positioning of the second area 32 in the ejection direction can be easily and accurately performed.

Figure 15:
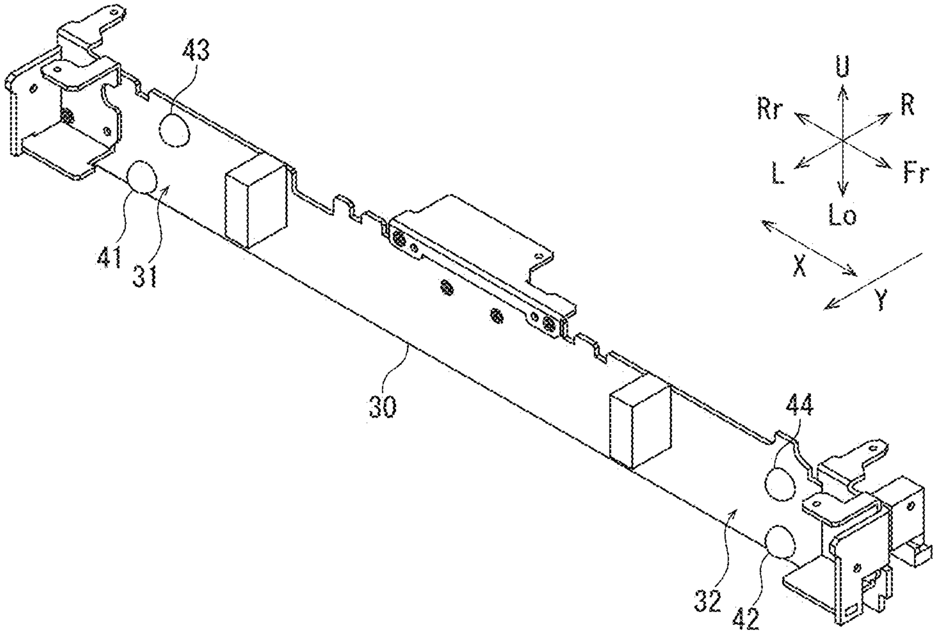
FIG. 15 is a perspective view showing the head frame according to a second modified example of the present invention.

[Second Modified Example] In addition to the configuration of the above embodiment, a fourth protruding part 44 protruding from the second area 32 toward the second positioning part 52 and provided at a position different from the second protruding part 42 in the ejection direction may be provided. FIG. 15 is a perspective view of the head frame 30 according to the second modified example. The third protruding part 43 is provided closer to the conveyance path 10 than that of the above embodiment, and the fourth protruding part 44 is provided at a position farther from the conveyance path 10 than the third protruding part 43. The fourth protruding part 44, like the first protruding part 41 and the others, has a hemispherical head portion and a male screw portion (not shown) protruding from the head portion to the right side (on the side of the head frame 30). The head frame 30 has a female screw portion (not shown) into which the male screw portion is screwed. An amount of protrusion of the fourth protruding part 44 from the second area 32 is adjusted by the operation of tightening and loosening the male screw part. When the second pressing part 62 presses the head frame 30 leftward through the inkjet head 12, the fourth protruding part 44 is pressed against the second positioning part 52. With this configuration, the fall and vibration of the head frame 30 can be suppressed.

[Other Modified Example] The above embodiments show an example in which the cross-section of the first groove part 51V is V-shaped and the first protruding part 41 is hemispherical, but the shapes of the first groove part 51V and the first protruding part 41 may have different shapes. For example, the cross-section of the first groove part 51V may be V-shaped and the first protruding part 41 may be conical having a smaller taper angle than the first groove part 51V. Alternatively, the first protruding part 41 may be hemispherical and the cross-section of the first groove part 51V may be hemispherical having a radius of curvature larger than that of the head portion 41H of the first protruding part 41. In short, the shapes of the first groove part 51V and the first protruding part 41 need only be such that the first groove part 51V does not constrain the posture of the first protruding part 41.

The above embodiments show an example in which the second positioning part 52 is planar and the second protruding part 42 is hemispherical, but the second protruding part 42 need not be hemispherical, as long as it has a curved surface in contact with the second positioning part 52 at one point. In short, the shape of the second protruding part 42 only needs to be such that the second positioning part 52 does not constrain the posture of the second protruding part 42.

The above embodiments show an example in which the amount of protrusion of the first protruding part 41 to the third protruding part 43 from the head frame 30 can be adjusted, but the first protruding part 41 to the third protruding part 43 may be fixed to the head frame 30 so that the amount of protrusion does not change.

The above embodiments show an example in which the first protruding part 41 is provided closer to the conveyance path 10 than the center of the head frame 30 in the ejection direction, but the first protruding part 41 may be provided on the opposite side of the conveyance path 10 to the center of the head frame 30 in the ejection direction.

The third protruding part 43 shown in the above embodiment may not be provided.

The above embodiments show an example in which the conveyance direction Y of the sheet S is horizontal, but the conveyance direction Y can be any direction. For example, the present invention may be applied to the printer in which the sheet S is wrapped around a drum and conveyed, and the head unit 11 is arranged radially around the drum.

The above embodiments show an example in which the first pressing part 61 and the second pressing part 62 are provided with the ball plungers 61P and 62P, respectively, but the first pressing part 61 and the second pressing part 62 can be any configuration as long as they are configured to press the first protruding part 41 and the second protruding part 42. For example, it may be provided with a sliding member that can slide in the left-and-right direction and a spring that biases the sliding member to the left side.

The invention claimed is:

1. An inkjet recording apparatus comprising:
- an inkjet head which ejects ink;
- a flat plate-shaped head frame whose thickness direction is along a first direction perpendicular to an ejection direction of the inkjet head and holding the inkjet head;
- an image forming frame by which the head frame holding the inkjet head is supported;
- a first positioning part provided in the image forming frame and facing in the thickness direction to a first area of the head frame on one end side in a second direction perpendicular to the ejection direction and the first direction;
- a second positioning part provided in the image forming frame and facing in the thickness direction to a second area of the head frame on the other end side in the second direction;
- a first protruding part protruding from the first area toward a side of the first positioning part;
- a second protruding part protruding from the second area toward a side of the second positioning part;
- a first groove part provided in the first positioning part along the ejection direction;
- a first pressing part pressing the first protruding part to the first groove part;
- a second pressing part pressing the second protruding part to the second positioning part; and
- a regulation part restricting a movement of the head frame in the ejection direction.

2. The inkjet recording apparatus according to claim 1, wherein
- the second positioning part is planar, and
- the second protruding part is hemispherical.

3. The inkjet recording apparatus according to claim 1 wherein
- the first protrusion and the second protrusion each has a male screw portion, and
- the head frame has female screw portions into which the male screw portions are screwed.

4. The inkjet recording apparatus according to claim 1, wherein
- the first protruding part is provided on a downstream side of a center of the head frame in the ejection direction.

5. The inkjet recording apparatus according to claim 1, further comprising:
- a third protruding part protruding from the first area toward a side of the first positioning part, provided at a position different from the first protruding part in the ejection direction, and facing a planar outside portion of the first groove part of the first positioning part, wherein
- the first pressing part presses the first protruding part to the planer portion.

6. The inkjet recording apparatus according to claim 1, wherein
- an odd number of the inkjet heads are arranged on both side surfaces of the head frame in a staggered manner, and
- the first protruding part and the second protruding part are provided on the surface of the head frame where a small number of the inkjet heads are provided.

7. The inkjet recording apparatus according to claim 1, further comprising:
- a second groove part provided in the second positioning part along the second direction, wherein
- the second pressing part presses the second protruding part to the second groove part.

8. The inkjet recording apparatus according to claim 1, further comprising:
- a fourth protruding part protruding from the second area toward a side of the second positioning part and provided at a position difference from the second protruding part in the ejection direction.

9. The inkjet recording head according to claim 1, wherein
- an odd number of the inkjet heads are arranged on both side surfaces of the head frame in a staggered manner, and
- the first area and the second area are provided on the surface of the head frame where a small number of the inkjet heads are provided.

10. An inkjet recording apparatus comprising:
- an inkjet head which ejects ink;
- a flat plate-shaped head frame whose thickness direction is along a first direction perpendicular to an ejection direction of the inkjet head and holding the inkjet head;
- a first positioning part facing in the thickness direction to a first area of the head frame on one end side in a second direction perpendicular to the ejection direction and the first direction;
- a second positioning part facing in the thickness direction to a second area of the head frame on the other end side in the second direction;
- a first protruding part protruding from the first area toward a side of the first positioning part;
- a second protruding part protruding from the second area toward a side of the second positioning part;

a first groove part provided in the first positioning part along the ejection direction;

a first pressing part pressing the first protruding part to the first groove part;

a second pressing part pressing the second protruding part to the second positioning part; and a regulation part restricting a movement of the head frame in the ejection direction, wherein the first groove part is tapered in a depth direction; and the first protruding part is hemispherical.

* * * * *